United States Patent [19]
Copete Vidal et al.

[11] Patent Number: 6,133,219
[45] Date of Patent: Oct. 17, 2000

[54] REDUCTIVE BLEACHING AGENT

[75] Inventors: Terese Copete Vidal, Sabadell; Emili Brau Balague, Santa Barbara, both of Spain

[73] Assignee: Henkel Kommanditgesellschaft auf Aktien, Germany

[21] Appl. No.: 09/125,561

[22] PCT Filed: Feb. 14, 1997

[86] PCT No.: PCT/EP97/00697

§ 371 Date: Nov. 4, 1998

§ 102(e) Date: Nov. 4, 1998

[87] PCT Pub. No.: WO97/31148

PCT Pub. Date: Aug. 28, 1997

[30] Foreign Application Priority Data

Feb. 22, 1996 [ES] Spain ................................. 19606620

[51] Int. Cl.[7] ............................. C11D 14/02; C11D 3/00; D06L 3/00; B01D 19/00; C02F 1/70

[52] U.S. Cl. ...................... 510/374; 510/276; 510/281; 510/367; 510/370; 510/461; 510/470; 8/101; 252/188.1

[58] Field of Search ..................... 510/276, 281, 510/367, 370, 374, 461, 470; 8/101; 252/188.1

[56] References Cited

U.S. PATENT DOCUMENTS

| | | | |
|---|---|---|---|
| 1,985,424 | 12/1934 | Piggott | 260/124 |
| 2,016,962 | 10/1935 | Flint et al. | 260/127 |
| 2,703,798 | 3/1955 | Schwartz | 260/211 |
| 5,366,510 | 11/1994 | Wasinger et al. | 8/110 |
| 5,374,716 | 12/1994 | Biermann et al. | 536/18.6 |
| 5,549,715 | 8/1996 | Olip | 8/110 |
| 5,576,425 | 11/1996 | Hill et al. | 536/18.6 |

FOREIGN PATENT DOCUMENTS

| | | |
|---|---|---|
| 0 301 298 | 2/1989 | European Pat. Off. . |
| 0 654 557 | 5/1995 | European Pat. Off. . |
| 25 54 360 | 6/1977 | Germany . |
| 31 28 984 | 3/1982 | Germany . |
| 43 06 827 | 9/1994 | Germany . |
| 05001299 | 1/1993 | Japan . |
| WO90/03977 | 4/1990 | WIPO . |
| WO92/06984 | 4/1992 | WIPO . |

OTHER PUBLICATIONS

J. Falbe (ed.), "Surfactants in Consumer Products," Springer Verlag, Berlin (1987), pp. 54–124.
E. Hoshino, et al., J. Biochem. (1994) 114, pp. 230–235.
E. Hoshino, et al., J. Biochem. (1994) 115, pp. 837–842.
E. Hoshino, et al., Journal of Fermentation and Bioengineering (1994) 77, No. 5, pp. 496–502.
Chemical Abstract 98:145006q (1983).

*Primary Examiner*—Jill Warden
*Assistant Examiner*—Monique T. Cole
*Attorney, Agent, or Firm*—John E. Drach; Steven J. Trzaska

[57] ABSTRACT

A reductive bleaching composition containing: (a) from 80 to 90% by weight of a glucose component; (b) from 1 to 5% by weight of a nonionic surfactant; and (c) from 5 to 20% by weight of a buffer salt selected from the group consisting of an inorganic buffer salt, an organic buffer salt, and mixtures thereof, all weights being based on the total weight of the composition.

14 Claims, No Drawings

REDUCTIVE BLEACHING AGENT

BACKGROUND OF THE INVENTION

1. Field of the Invention

This invention relates to reductive bleaching formulations containing glucose, nonionic surfactants and buffer salts, to a process for the alkaline bleaching of dyed cotton fabrics and to the use of the formulations as reductive bleaching agents.

2. Discussion of Related Art

The annual world production of jeans amounts to several million pairs. A large part of this total is subjected to an artificial ageing process in which the jeans are treated together with stones in a wash liquor so that they assume a "worn" appearance, but at the same time are made softer and hence more comfortable to wear. In addition, the statistical washing out of color associated with the worn appearance is often desired by the consumer ("stonewash effect"). Another consumer demand is similarly directed, i.e. to bleach the fabric and to give it a used appearance. To this end, the fabric is generally treated with alkaline hypochlorite liquors or hydrogen peroxide. Although the bleaching agents mentioned are extremely effective to use, they also have serious disadvantages. Thus, the use of hypochlorites leads to very considerable AOX pollution of the wastewater while the use of hydrogen peroxide, particularly in the form of concentrated solutions, is only possible with considerable outlay on anti-explosion measures. In addition, both hypochlorite and hydrogen peroxide not only bleach the fabric, they also cause non-selective damage so that, in the course of bleaching, 10–15 pairs of blue jeans out of 100 generally have to be rejected.

DE-A1 4306827 (Rotta) describes a process for bleaching textiles, preferably denim, treated with vat dyes in which glucose in the form of an alkaline solution is used as reducing agent. Although the reject rate can thus be distinctly reduced in relation to the treatment with hypochlorite, the result obtained is still not entirely satisfactory. In addition, the lightening in color and, in particular, the softness of the fabrics are unsatisfactory.

Accordingly, the problem addressed by the present invention was to provide bleaching agents which would not have any of the disadvantages mentioned above.

DESCRIPTION OF THE INVENTION

The present invention relates to reductive bleaching agents for the alkaline treatment of dyed cotton fabric containing
(a) 80 to 90 and preferably 82 to 88% by weight of glucose,
(b) 1 to 5 and preferably 2 to 4% by weight of nonionic surfactants and
(c) 5 to 20 and preferably 10 to 15% by weight of inorganic and/or organic buffer salts,
with the proviso that the quantities shown add up to 100% by weight.

It has surprisingly been found that the formulations according to the invention not only are ecotoxicologically safe, they readily bleach dyed cotton fabric under alkaline conditions without causing any corrosion problems in the equipment used and without affecting fiber quality. The reject rate of the treated textiles is below 2%. Textiles with excellent color lightening and a very good soft feel are obtained.

The present invention also relates to a process for the reductive bleaching of dyed cotton fabric in which the fabric is treated at pH 13 to 14 with a formulation containing
(a) 80 to 90 and preferably 82 to 88% by weight of glucose,
(b) 1 to 5 and preferably 2 to 4% by weight of nonionic surfactants and
(c) 5 to 20 and preferably 10 to 15% by weight of inorganic and/or organic buffer salts,
with the proviso that the quantities shown add up to 100% by weight.

Nonionic surfactants

Typical examples of nonionic surfactants which may be used as component (b) in accordance with the invention are fatty alcohol polyglycol ethers, alkylphenol polyglycol ethers, fatty acid polyglycol esters, fatty acid amide polyglycol ethers, fatty amine polyglycol ethers, alkoxylated triglycerides, mixed ethers and mixed formals, alk(en)yl oligoglycosides, fatty acid-N-alkyl polyhydroxyalkyl amides, protein hydrolyzates (particularly wheat-based vegetable products), polyol fatty acid esters, sugar esters, sorbitan esters, polysorbates and amine oxides. If the nonionic surfactants contain polyglycol ether chains, they may have a conventional homolog distribution, although they preferably have a narrow homolog distribution. The surfactants mentioned are all known compounds. Information on their structure and production can be found in relevant synoptic works, cf. for example J. Falbe (ed)., "Surfactants in Consumer Products", Springer Verlag, Berlin, 1987, pages 54–124 and J. Falbe (ed.), "Katalysatoren, Tenside und Mineralöl-additive", Thieme Verlag, Stuttgart, 1978, pages 123–217. It is particularly preferred to use alkyl and/or alkenyl oligoglycosides, fatty acid-N-alkyl polyhydroxyalkyl amides and, in particular, fatty alcohol polyglycol ethers in quantities of 2 to 4% by weight, based on the formulations.

Alkyl and/or alkenyl oligoglycosides

Alkyl and alkenyl oligoglycosides are known nonionic surfactants which correspond to formula (I):

$$R^1O\text{---}[G]_p \qquad (I)$$

where $R^1$ is an alkyl and/or alkenyl radical containing 4 to 22 carbon atoms, G is a sugar unit containing 5 or 6 carbon atoms and p is a number of 1 to 10. They may be obtained by the relevant methods of preparative organic chemistry. EP-A1-0 301 298 and WO 90/03977 are cited as representative of the extensive literature available on this subject. The alkyl and/or alkenyl oligoglycosides may be derived from aldoses or ketoses containing 5 or 6 carbon atoms, preferably glucose. Accordingly, the preferred alkyl and/or alkenyl oligoglycosides are alkyl and/or alkenyl oligoglucosides. The index p in general formula (I) indicates the degree of oligomerization (DP), i.e. the distribution of mono- and oligoglycosides, and is a number of 1 to 10. Whereas p in a given compound must always be an integer and, above all, may assume a value of 1 to 6, the value p for a certain alkyl oligoglycoside is an analytically determined calculated quantity which is generally a broken number. Alkyl and/or alkenyl oligoglycosides having an average degree of oligomerization p of 1.1 to 3.0 are preferably used. Alkyl and/or alkenyl oligoglycosides having a degree of oligomerization of less than 1.7 and, more particularly, between 1.2 and 1.4 are preferred from the applicational point of view. The alkyl or alkenyl radical $R^1$ may be derived from primary alcohols containing 4 to 11 and preferably 8 to 10 carbon atoms. Typical examples are butanol, caproic alcohol, caprylic alcohol, capric alcohol and undecyl alcohol and the technical mixtures thereof obtained, for example, in the hydrogenation of technical fatty acid methyl esters or in the hydrogenation of aldehydes from Roelen's oxosynthesis. Alkyl oligoglucosides having a chain length of $C_8$ to $C_{10}$ (DP=1 to 3), which are obtained as first runnings in the separation of technical $C_{8-18}$ coconut oil fatty alcohol by distillation and which may contain less than 6% by weight of $C_{12}$ alcohol as an impurity, and also alkyl oligoglucosides based on technical $C_{9/11}$ oxoalcohols (DP=1 to 3) are preferred. In addition, the alkyl or alkenyl radical $R^1$ may also be derived from primary alcohols containing 12 to 22 and preferably 12 to 14 carbon atoms. Typical examples are lauryl alcohol, myristyl alcohol, cetyl alcohol, palmitoleyl alcohol, stearyl alcohol, isostearyl alcohol, oleyl alcohol, elaidyl alcohol, petroselinyl alcohol, arachyl alcohol, gadoleyl alcohol, behenyl alcohol, erucyl alcohol, brassidyl alcohol and technical mixtures thereof which may be obtained as described above. Alkyl oligoglucosides based on hydrogenated $C_{12/14}$ coconut oil fatty alcohol having a DP of 1 to 3 are preferred.

Fatty acid-N-alkyl polyhydroxyalkylamides

Fatty acid-N-alkyl polyhydroxyalkylamides are nonionic surfactants which correspond to formula (II):

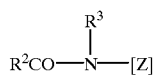

(II)

where $R^2CO$ is an aliphatic acyl radical containing 6 to 22 carbon atoms, $R^3$ is hydrogen, an alkyl or hydroxyalkyl radical containing 1 to 4 carbon atoms and [Z] is a linear or branched polyhydroxyalkyl radical containing 3 to 12 carbon atoms and 3 to 10 hydroxyl groups.

The fatty acid-N-alkyl polyhydroxyalkylamides are known compounds which may normally be obtained by reductive amination of a reducing sugar with ammonia, an alkylamine or an alkanolamine and subsequent acylation with a fatty acid, a fatty acid alkyl ester or a fatty acid chloride. Processes for their production are described in U.S. Pat. No. 1,985,424, in U.S. Pat. No. 2,016,962 and in U.S. Pat. No. 2,703,798 and in International patent application WO 92/06984. An overview of this subject by H. Kelkenberg can be found in Tens. Surf. Det. 25, 8 (1988). The fatty acid-N-alkyl polyhydroxyalkylamides are preferably derived from reducing sugars containing 5 or 6 carbon atoms, more particularly from glucose. Accordingly, the preferred fatty acid-N-alkyl polyhydroxyalkylamides are fatty acid-N-alkyl glucamides which correspond to formula (III):

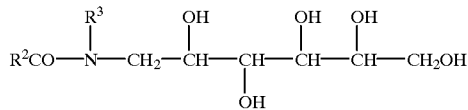

(III)

Preferred fatty acid-N-alkyl polyhydroxyalkylamides are glucamides corresponding to formula (III) in which $R^3$ is an alkyl group and $R^2CO$ represents the acyl component of caproic acid, caprylic acid, capric acid, lauric acid, myristic acid, palmitic acid, palmitoleic acid, stearic acid, isostearic acid, oleic acid, elaidic acid, petroselic acid, linoleic acid, linolenic acid, arachic acid, gadoleic acid, behenic acid or erucic acid or technical mixtures thereof. Fatty acid-N-alkyl glucamides (III) obtained by reductive amination of glucose with methylamine and subsequent acylation with lauric acid or $C_{12/14}$ coconut oil fatty acid or a corresponding derivative are particularly preferred. In addition, the polyhydroxyalkylamides may also be derived from maltose and palatinose.

Fatty alcohol Polyglycol ethers

Fatty alcohol polyglycol ethers are nonionic surfactants which are industrially produced by addition of ethylene oxide and/or propylene oxide onto primary alcohols. According to the invention, it is preferred to use fatty alcohol polyglycol ethers corresponding to formula (IV):

(IV)

in which $R^4$ is a linear or branched alkyl and/or alkenyl group containing 6 to 22 and preferably 16 to 18 carbon atoms, $R^5$ is hydrogen or a methyl group and n is a number of 20 to 50 in the case of hydrogen and 1 to 2 in the case of methyl. Typical examples are the adducts of 25 to 30 moles of ethylene oxide or 1 to 2 moles of propylene oxide with caproic alcohol, caprylic alcohol, 2-ethylhexyl alcohol, capric alcohol, lauryl alcohol, isotridecyl alcohol, myristyl alcohol, cetyl alcohol, palmitoleyl alcohol, stearyl alcohol, isostearyl alcohol, oleyl alcohol, elaidyl alcohol, petroselinyl alcohol, elaeostearyl alcohol, arachyl alcohol, gadoleyl alcohol, behenyl alcohol, erucyl alcohol and brassidyl alcohol and the technical mixtures thereof obtained, for example, in the high-pressure hydrogenation of technical methyl esters based on fats and oils or aldehydes from Roelen's oxosynthesis and as monomer fraction in the dimerization of unsaturated fatty alcohols. Ethoxylates of technical $C_{16-18}$ fatty alcohols, for example cetearyl alcohol or tallow fatty alcohol, are preferred.

Buffer salts

Preferred buffer salts are alkali metal, alkaline earth metal and/or ammonium halides, sulfates, carbonates, hydrogen carbonates, phosphates, hydrogen phosphates, acetates, lactates and/or citrates. Typical examples are sodium sulfate, sodium carbonate, sodium hydrogen carbonate, potassium hydrogen phosphate, magnesium acetate, magnesium lactylate and potassium citrate. Beside the salts, free acids, preferably citric acid, may also be used as buffers. The buffer salts are preferably used in quantities of 12 to 18% by weight, based on the formulations.

Other ingredients

The bleaching formulations according to the invention may contain cellulases which add a "stonewash" effect to the bleaching effect as further components. Cellulases (1,4-β-D-glucan-4-glucanohydrolyases; EC 3.2.1.4) are enzyme complexes which are instrumental in the degradation of native cellulose. Cellulases which show optimal activity under alkaline conditions are of course preferably used. They may make up from 1 to 15% by weight and preferably from 5 to 10% by weight of the bleaching formulations. The interaction of cellulases with cellulose is reviewed, for example, by E. Hoshino in J. Biochem. 114 230; 236 (1994), ibid 115, 837 (1994) and J. Ferment. Bioeng. 77, 496 (1994).

Reductive bleaching

The bleaching of the cotton fabric, which is preferably indigo-dyed denim, is preferably carried out at a temperature of 70 to 98° C. To this end, a liquor is prepared by adding about 3 to 10 kg of fabric to 50 to 100 liters of water and introducing the bleaching agent according to the invention in a quantity of normally 0.5 to 2 kg and preferably 1 to 1.5 kg per kg of fabric. The bleaching liquor is alkalized, i.e. adjusted to a pH value of 13 to 14, by addition of alkali metal hydroxides, preferably concentrated sodium hydroxide solution, agitated for generally about 30 to 60 mins. and then neutralized by addition of mineral acids.

Commercial Applications

The formulations according to the invention are not only distinguished by an excellent reductive bleaching effect on dyed cotton fabric, they also cause significantly less damage to the fabric. Compared with known products, they have improved ecotoxicological properties, are less corrosive and lead to lighter and softer fabrics. Accordingly, the present invention also relates to their use as reductive bleaching formulations for treating dyed cotton fabric.

EXAMPLES

Example 1

160 liters of water were introduced into and heated to 90° C. in a 200 liter V4A stainless steel vat equipped with a stirrer. A pH value of 14 was adjusted by addition of concentrated sodium hydroxide solution. Blue jeans with a total weight of 8 kg were introduced into the alkaline liquor. 1 kg of a bleaching formulation having the following composition was then added:
85% by weight of glucose,
2% by weight of tallow alcohol+25 EO and
13% by weight of sodium sulfate.

The bleaching liquor was stirred for 1 hour and then neutralized by addition of mineral acid. The blue jeans were removed from the liquor and washed first with water and then with a commercially available perborate detergent at 40° C. The jeans showed uniform lightening without any adverse effect on their mechanical properties, more particularly their tear strength in the vicinity of seams. Based on 100 pairs of blue jeans, a reject rate of 1% was caused by inadequate tear strength in the vicinity of seams. The softness of the jeans was evaluated by a panel of six trained testers on a scale of 1 (=very soft) to 4 (=hard). As the average of three measurements, a value of 1.4 was obtained for the Example according to the invention.

Examples 2 and 3

Example 1 was repeated using a bleaching formulation consisting of 83% by weight of glucose, 7% by weight of cocoalkyl oligoglucoside or lauric acid-N-methyl glucamide, 8% by weight of sodium citrate and 2% by weight of sodium perborate. In both cases, the blue jeans again showed uniform lightening and, in addition, an improved soft feel.

Comparison Example C1

Example 1 was repeated using a mixture of 85% by weight of glucose and 15% by weight of sodium sulfate. Based on 100 pairs of blue jeans, the reject rate was 5% and the softness rating 2.9.

What is claimed is:

1. A composition containing:
    (a) from 80 to 90% by weight of a glucose;
    (b) from 1 to 5% by weight of a nonionic surfactant corresponding to formula II:

$$R^2O(CH_2CH_2O)_nH \qquad (II)$$

wherein $R^2$ is a linear or branched alkyl or alkenyl group containing from 6 to 22 carbon atoms and n is a number from 20 to 50; and
    (c) from 5 to 20% by weight of a buffer salt selected from the group consisting of an inorganic buffer salt, an organic buffer salt, and mixtures thereof, all weights being based on the total weight of the composition.

2. The composition of claim 1 wherein the glucose component is present in the composition in an amount of from 82 to 88% by weight, based on the weight of the composition.

3. The composition of claim 1 wherein the nonionic surfactant is present in the composition in an amount of from 2 to 4% by weight, based on the weight of the composition.

4. The composition of claim 1 wherein the buffer salt is present in the composition in an amount of from 10 to 15% by weight, based on the weight of the composition.

5. The composition of claim 1 wherein the glucose component corresponds to formula I $$R^1O-[G]_p$$

wherein $R^1$ is a radical containing from 12 to 14 carbon atoms and p is a number from 1 to 3.

6. The composition of claim 1 further comprising from 1 to 15% by weight, based on the weight of the composition, of a cellulase component.

7. The composition of claim 6 wherein the cellulase component is present in the composition in an amount of from 5 to 10% by weight, based on the weight of the composition.

8. A process for bleaching a dyed cotton substrate comprising contacting the substrate with a reductive bleaching composition, said composition containing:
    (a) from 80 to 90% by weight of a glucose component corresponding to formula I:

$$R^1O-[G]_p \qquad (I)$$

wherein $R^1$ is an alkyl and/or alkenyl radical containing from 4 to 22 carbon atoms, G is a sugar unit containing 5 or 6 carbon atoms, and p is a number of from 1 to 10;
    (b) from 1 to 5% by weight of a nonionic surfactant corresponding to formula II:

$$R^2O(CH_2CH_2O)_nH \qquad (II)$$

wherein $R^2$ is a linear or branched alkyl or alkenyl group containing from 6 to 22 carbon atoms and n is a number from 20 to 50; and
    (c) from 5 to 20% by weight of a buffer salt selected from the group consisting of an inorganic buffer salt, an organic buffer salt, and mixtures thereof, all weights being based on the total weight of the composition.

9. The process of claim 8 wherein the glucose component is present in the composition in an amount of from 82 to 88% by weight, based on the weight of the composition.

10. The process of claim 8 wherein the nonionic surfactant is present in the composition in an amount of from 2 to 4% by weight, based on the weight of the composition.

11. The process of claim 8 wherein the buffer salt is present in the composition in an amount of from 10 to 15% by weight, based on the weight of the composition.

12. The process of claim 8 wherein in formula I, $R^1$ is a radical containing from 12 to 14 carbon atoms and p is a number from 1 to 3.

13. The process of claim 8 wherein the reductive bleaching composition further comprises from 1 to 15% by weight, based on the weight of the composition, of a cellulase component.

14. The process of claim 13 wherein the cellulase component is present in the composition in an amount of from 5 to 10% by weight, based on the weight of the composition.

* * * * *